United States Patent [19]

Cline

[11] Patent Number: 4,541,650
[45] Date of Patent: Sep. 17, 1985

[54] MOTORCYCLE RIDE-OFF STAND

[76] Inventor: Jack B. Cline, 12827 Bromwich St., Arleta, Calif. 91331

[21] Appl. No.: 540,432

[22] Filed: Oct. 11, 1983

[51] Int. Cl.⁴ .............................................. B62H 1/06
[52] U.S. Cl. ................................... 280/299; 280/300; 280/755; 182/200
[58] Field of Search ............... 280/293, 298, 299, 304, 280/289 G, 755, 300, 301, 296; 182/200; 248/188.2; 108/130, 131, 132; 180/119

[56] References Cited

U.S. PATENT DOCUMENTS

| 653,681 | 7/1900 | Lee | 280/296 |
|---|---|---|---|
| 1,195,404 | 8/1916 | Scott | 280/299 |
| 1,280,069 | 9/1918 | Morgan | 280/299 |
| 3,712,640 | 1/1973 | Shipman et al. | 280/301 |
| 4,432,562 | 2/1984 | Cline | 280/304 |

FOREIGN PATENT DOCUMENTS

| 696379 | 9/1940 | Fed. Rep. of Germany | 280/293 |
|---|---|---|---|
| 2206326 | 8/1973 | Fed. Rep. of Germany | 182/200 |
| 1388939 | 1/1965 | France | 280/293 |
| 108757 | 10/1943 | Sweden | 280/299 |
| 656438 | 8/1951 | United Kingdom | 182/200 |

Primary Examiner—Joseph F. Peters, Jr.
Assistant Examiner—Everett G. Diederiks, Jr.
Attorney, Agent, or Firm—Jack C. Munro

[57] ABSTRACT

A motorcycle ride-off stand having a generally U-shaped tubular housing which defines an internal open ended chamber. Mounted on the free end of each leg of the housing is a foot pad assembly. Each foot pad assembly is movable a limited amount in respect to the housing. Movement of the foot pad assemblies are in unison but in opposite directions. Movement transferring structure is located within the internal chamber of the housing which includes the use of an aligned series of balls so as to transfer the movement around the bends formed within the tubular housing. A manual actuator assembly is attached to the housing to pivot the entire housing from a stowed position to an extended position. A locking assembly is associated with the housing to fix in position the foot pad assemblies when located at a particular desired position.

5 Claims, 10 Drawing Figures

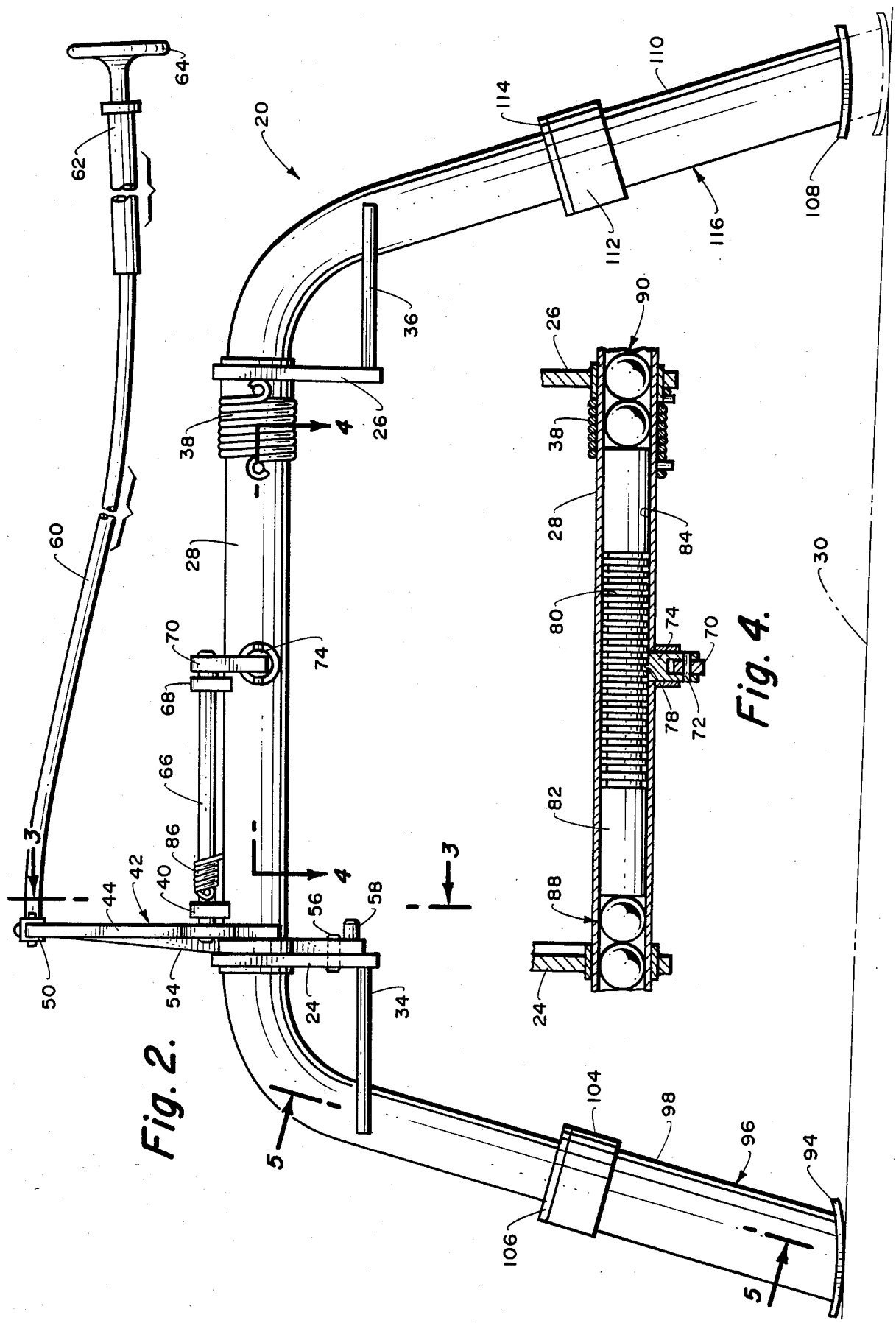

MOTORCYCLE RIDE-OFF STAND

BACKGROUND OF THE INVENTION

The field of this invention relates to a supporting stand for a two-wheeled vehicle and more particularly to a ride-off stand for a motorcycle.

The use of supporting stands has been known for a substantial period of time. When the two-wheeled vehicle is not being operated it is desired to provide some structure to support the two-wheeled vehicle in an upright manner. Such device is generally referred to as a supporting stand.

A common type of supporting stand utilizes a single member which is to protrude from the undercarriage of the motorcycle to contact the ground or street. The motorcycle is to lean and rest at an inclined position by this single supportive member. This type of stand is most adequate for lightweight vehicles. However, there are a substantial number of motorcycles each of which weigh several hundred pounds apiece. Because of the weight of the motorcycle, it is not at all uncommon for the motorcycle to merely tip over with such a single member stand. This is especially true if the supportive surface is not hard and level, such as a dirt or gravel surface. Such a heavy motorcycle falling will generally, at the very minimum, be scratched. Denting or other damage is also quite common.

To overcome the disadvantages of a single member supporting stand, there has been utilized what is termed a center stand. A center stand is mounted to the undercarriage of the chassis of the motorcycle in between the front and rear wheels. The center stand is to be moved from a stowed position to an extended position and the operator is to physically lift one of the wheels of the motorcycle, such as the front wheel, and the further longitudinally move the motorcycle a small amount so that the motorcycle will come to rest on the center stand with the stand then being in the fully extended position.

One conventional type of center stand is what is termed a "ride-off" stand. The front wheel of the motorcycle is placed slightly off the ground and the operator only need to start the motorcycle and locate the motorcycle in gear and move the motorcycle forward a slight amount which will cause the stand to be moved to a stowed position with the front wheel recontacting the ground.

The conventional ride-off stand is constructed of two rigid members which are to be in contact with the supportive surface, such as the ground. There is no way to adjust one rigid member with respect to the other member. This type of ride-off stand is designed primarily for use on a hard level surface, such as a street. However, there are a great many times that a motorcycle is parked on other than a hard surface, such as a dirt road, parking lot, gravel road or off-road terrain. Most often this terrain is not nearly level, which will cause the motorcycle to assume an inclined position.

Because of the inherent weight of most motorcycles, it does not take much of an inclined position for the motorcycle to tip over. Additionally, if the ground is even slightly wet, the center stand will normally penetrate the ground resulting in the motorcycle not being securely supported, and therefore, free to tip over.

SUMMARY OF THE INVENTION

The primary objective of the present invention is to construct a motorcycle ride-off stand which can be easily operated and will always locate the motorcycle in a vertically upright position on both level and unlevel terrain.

A still further objective of the present invention is to construct a motorcycle ride-off stand which can operate satisfactorily on both solid and loose supportive surfaces.

A further objective of the present invention is to construct a motorcycle ride-off stand which only requires a single manual movement to locate the ride-off stand in the operative position and upon slight forward longitudinal movement of the motorcycle, the ride-off stand will automatically retract into its stowed position.

A still further objective of the present invention is to construct a ride-off stand of few parts and therefore minimize manufacturing costs and therefore minimize cost to the consumer.

The motorcycle ride-off stand of the present invention includes a U-shaped tubular member having an internal open ended chamber. A tubular housing is to be mounted on the frame of the motorcycle and is to be pivotable between an upper or stowed position and a lower extended (operative) position. The tubular housing is continuously spring-biased to the stowed position. Mounted at each free end of each leg of the tubular housing is a foot pad assembly. Each foot pad assembly is movable with respect to the housing. Each foot pad assembly is continuously spring-biased toward a retracted position. Extending through the internal chamber of the tubular housing connecting together the foot pad assemblies is connecting structure in the form of a first series of balls, or elongated rod and a second series of balls. The balls and the elongated rod are to be movable within the chamber. Movement of one foot pad assembly in one direction causes the other foot pad assembly to move in the opposite direction. A manually operated actuator assembly is connected to the housing and upon activation causes the housing to be moved to the extended position. Also, connected to the housing is a locking assembly. The locking assembly is moved to the unlocking position during movement of the tubular housing from the stowed to the extended position. Upon manual release of the actuator assembly after the tubular housing has reached the extended position, the locking assembly is moved to the locking position, thereby, not permitting the foot pad assemblies to move relative to the tubular housing but maintain their established position.

BRIEF DESCRIPTION OF THE DRAWING

FIG. 2 is a front-elevational view taken along line 2—2 of FIG. 1 showing the ride-off stand of the present invention in the extended usable position;

FIG. 4 is a cross-sectional view through the apex portion of the tubular housing of the ride-off stand of the present invention taken along line 4—4 of FIG. 2;

DETAILED DESCRIPTION OF THE SHOWN EMBODIMENT

Figure 1:
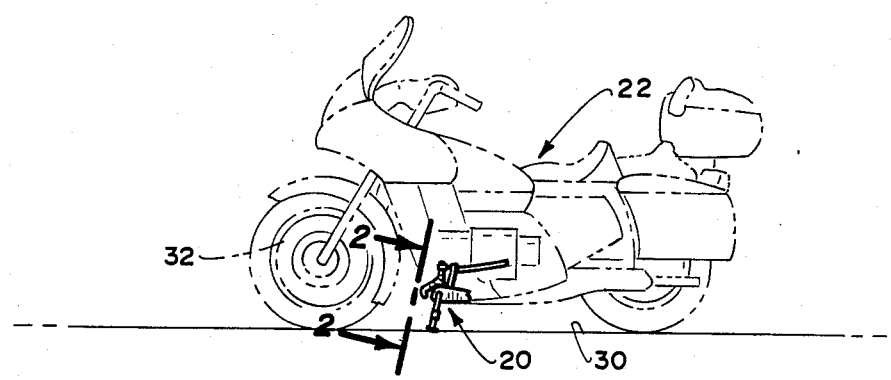
FIG. 1 is a side-elevational view of a motorcycle upon which has been mounted the ride-off stand of the present invention.
Figure 3:
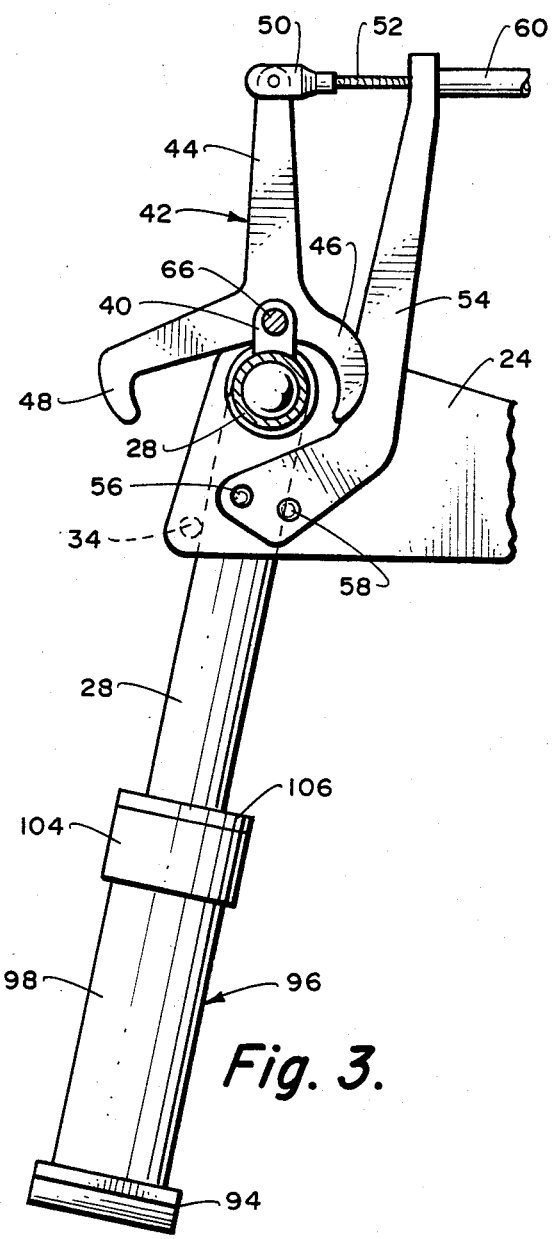
FIG. 3 is a view of the actuator assembly used in conjunction with the ride-off stand of the present invention taken along line 3—3 of FIG. 2 showing the actuator assembly in the position when the stand is in the extended position.
Figure 5:
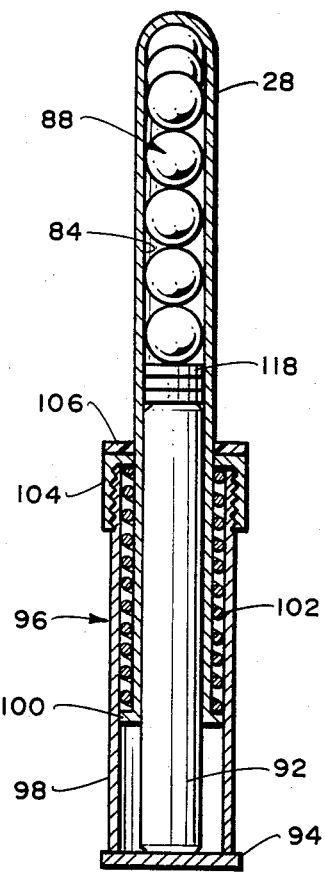
FIG. 5 is a cross-sectional view through one of the legs of the ride-off stand of the present invention taken along line 5—5 of FIG. 2.

Referring particularly to the drawings, there is shown a motorcycle ride-off stand 20 which is to be attached to a conventional motorcycle 22. Included as part of the frame of the motorcycle 22 is a pair of spaced-apart mounting plates 24 and 26. U-shaped tubular housing member 28 extends through openings provided within the plates 24 and 26. The tubular housing member 28 is pivotable in respect to the plates 24 and 26.

Tubular housing member 28 is to be pivotable in respect to the mounting plates 24 and 26 between an upper or stowed position to a lower extended position. The upper stowed position is represented within FIG. 6 of the drawings where the stand 20 is to be spaced from the ground 30 so as to not interfere with the motion of the motorcycle 22. With the tubular housing 28 in the extended position, at least some portion of the weight of the motorcycle will be supported by the stand 20 and that possibly even the front wheel 32 of the motorcycle 22 would be located just off the ground 30.

Fixedly attached to one end of the plate 24 is a rod 34. A similar rod 36 is attached and extends from the plate 26. The tubular housing 28, when in the completely extended position, will contact the rods 34 and 36. Therefore, the rods 34 and 36 function as stops to define the outer limit of the extended position of the housing 28.

A coil spring 38 is wrapped about the housing 28 with one end of the spring 38 being connected to the plate 26. The function of the spring 38 is to exert a continuous bias tending to locate the tubular housing 28 in the stowed position.

Mounted on the tubular housing 28 adjacent to plate 24 is an extension 40. Pivotly mounted on the extension 40 is a hook member 42. The hook member 42 includes an aft end 44 and a fore end which is divided into a first hook member 46 and a second hook member 48. The function of the hook members 46 and 48 will be explained further on in this specification.

Pivotly attached to the aft end 44 is a cable bracket 50. Fixedly connected to the cable bracket is an end of a cable 52. The cable 52 passes through an opening (not shown) formed within the free end of arm 54. The arm 54 is pivotally mounted by means of pivot pin 56 to plate 24. Attached to the arm 54 directly adjacent the pivot pin 56 and extending outwardly therefrom is a stop pin 58. The function of the stop pin 58 will be explained further on in this specification.

Attached to the outer end 54 is a cable sheath 60. The cable sheath 60 is attached to knob housing 62. The knob housing 62 is to be attached to some portion of the motorcycle. The cable 52 is fixedly secured to a knob 64. The knob 64 is capable of longitudinal movement relative to the housing 62.

The hook member 42 is pivotly mounted to the extension 40 by means of a rod 66. The rod 66 is rotatably mounted with respect to the extension 40 and also a similar extension 68. Rod 66, directly adjacent the extension 68, is attached to connecting arm 70. The connecting arm 70 is pivotly mounted by means of a pin 72 to the locking pawl 74. Pawl 74 is mounted within hole 76 formed within the tubular housing 28.

Inwardly attached to the pawl 74 is a protuberance 78. The protuberance 78 is capable of engaging with any one of a plurality of annular grooves 80 formed within an elongated rod 82. The rod 82 is slidably mounted in a close fitting relationship within chamber 84 formed within the tubular housing 28. The rod 82 will always be totally confined to the straight section of the tubular housing 28 that is located between the pair of spaced-apart legs of the tubular housing 28. This portion of the tubular housing 28 can be generally referred to as the apex section.

The rod 66 is spring-biased by a coil spring 86 in a direction to locate protuberance 78 within one of the grooves 80. This means that when the motorcycle stand 20 of this invention is located in the stowed position, the protuberance 78 will be located within one of the grooves 80.

Located within the chamber 84 adjacent one end of the rod 82 are a first series of balls 88. A second series of similar balls 90 is also located within chamber 84 directly adjacent the opposite end of rod 82. The balls 88 and 90 are of the same size and each closely conform within the chamber 84. The balls are to freely roll within the chamber 84. The balls 88 may be in physical contact with a rod 92. The balls 90 may be in contact with a rod (not shown) similar to rod 92. The rod 92 is in continuous contact against pad 94 of the foot pad assembly 96.

The pad 94 is attached to a sleeve 98. The free end of the housing 28 is formed into an annular flange 100. The annular flange 100 is slidably located in a telescoping manner within the sleeve 98. Pressing against the flange 100 is one end of a coil spring 102. The other end of the coil spring 102 contacts a cap 104. The cap 104 is threadably attached to the sleeve 98. A sealing disc 106 is located on the cap 104. It is the function of the sealing disc 106 to prevent entry of foreign material into the chamber occupied by the coil spring 102. The disc 106 will normally be constructed of some type of resilient material such as rubber or plastic.

It is to be understood that the rod which was previously mentioned which is in contact with the second series of balls 90 is attached to the foot pad 108. The foot pad 108 has a sleeve 110 extending therefrom. The sleeve 110 is slidably secured by a cap 112. The cap 112 has attached thereto a sealing disc 114. This structure comprises a second foot pad assembly 116. The foot pad assembly 116 is identical to the foot pad assembly 96. It is to be understood within the foot pad assembly 116 that there is also a coil spring (not shown) which is similar to spring 102.

Located between the rod 92 and the first series of balls 88 there may be located one or more discs 118. The more discs 118 that are located in position between the balls 88 and the rod 92, the higher the front wheel 32 of the motorcycle will be raised in respect to the ground 30. Therefore, the discs 118 are to be utilized to achieve a desired amount of height of the front wheel 32 and also in order to achieve adjustability versus a particular type of motorcycle on which the stand 20, this invention, has been mounted. If the particular motorcycle is built "close to the ground", the discs 118 may not be used. Vice versa, if the motorcycle is built "high off the ground", many discs 118 may be used. It is to be understood that normally an identical number of discs 118 will be located in contact with the second series of balls 90.

Figure 6:
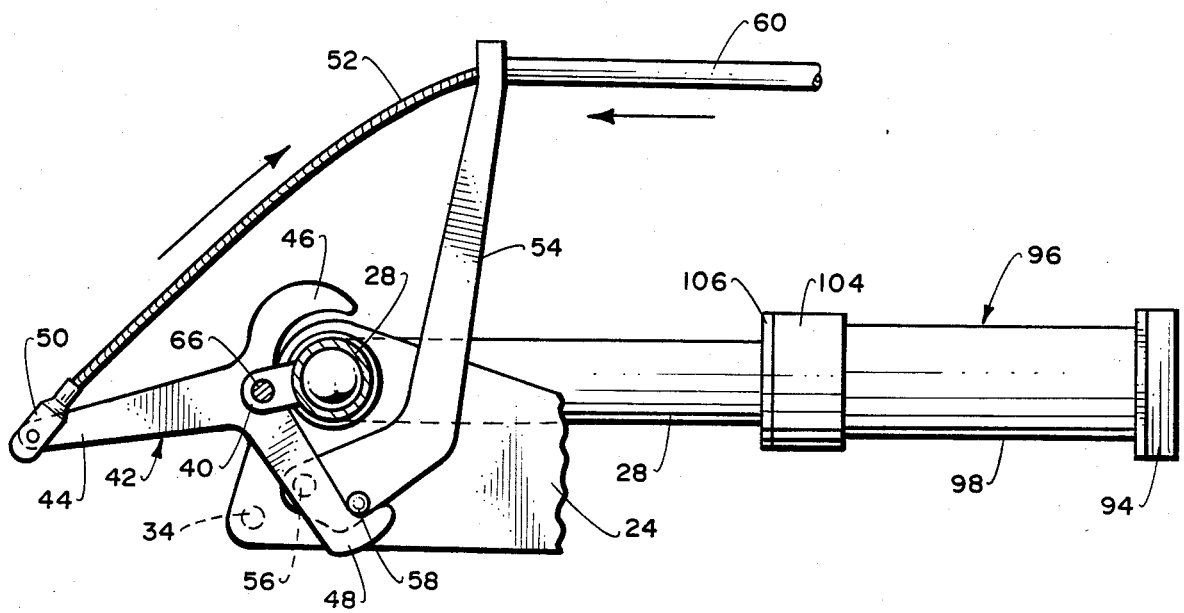
FIG. 6 is a view similar to FIG. 3, but showing the actuator assembly in the position that it occupies when the ride-off stand is in the stowed position.
Figure 7:
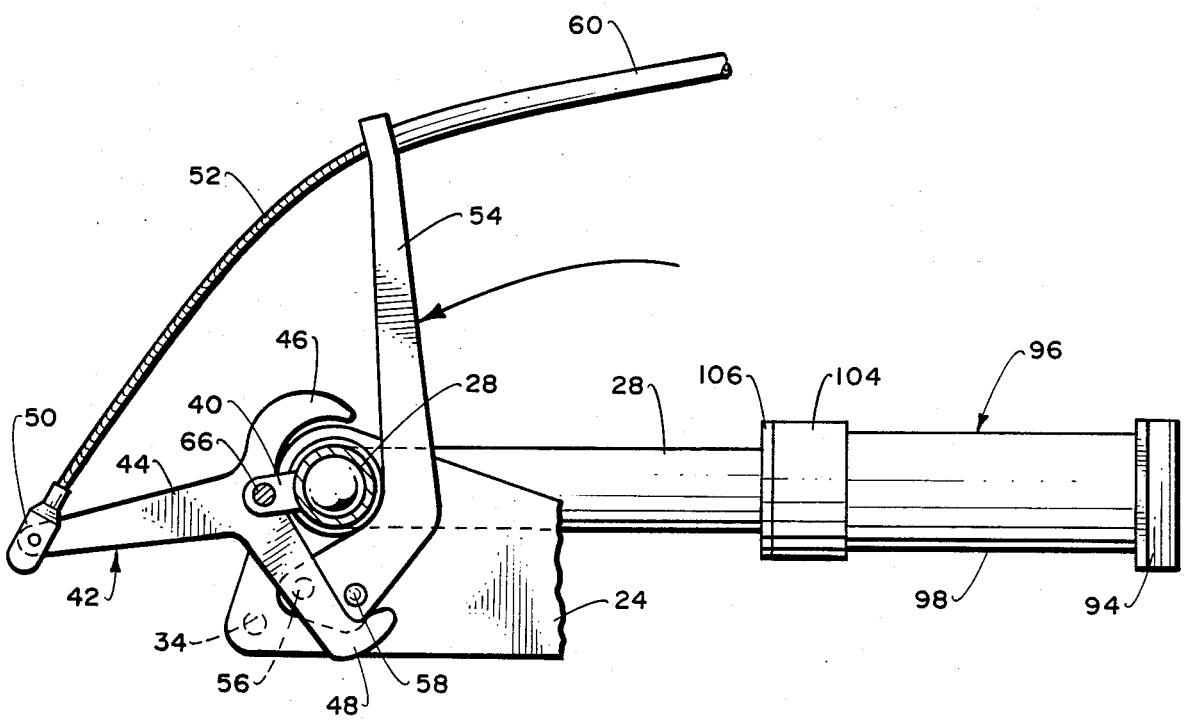
FIG. 7 is a view similar to FIG. 6, but showing the actuator assembly in its position immediately after initial operation of the actuator assembly.

The operation of the motorcycle stand of this invention is as follows: It will be assumed that the stand 20 is in the upper or stowed position which is shown in FIG. 6 of the drawings. Let it be assumed that the operator wishes to move the stand to the lower or extended position. In order to accomplish this, the operator grasps knob 64 and moves the cable 52 relative to the sheath 60 and the housing 62. Initially, this movement is such that the sheath 60 is moved opposingly to movement of the cable 52. Movement of the sheath 60 results in arm 54 pivoting until the arm 54 contacts the tubular housing 28. This position is shown in FIG. 7 of the drawings. At this particular time the stop pin 58 is disengaged from the second hook member 48. Engagement of the stop pin 58 with the second hook member 48 absolutely prevents any downward movement of the stand 20 during operation of the motorcycle. Although the spring 38 functions to hold the stand 20 in this stowed position, it has been found that a positive holding device is preferred to prevent the stand 20 from "bouncing" toward the extended position such as what might occur upon the motorcycle 22 contacting a bump or hole in the road. Therefore, with the pin 58 in contact with the hook member 48, such downward movement is prevented.

Figure 8:
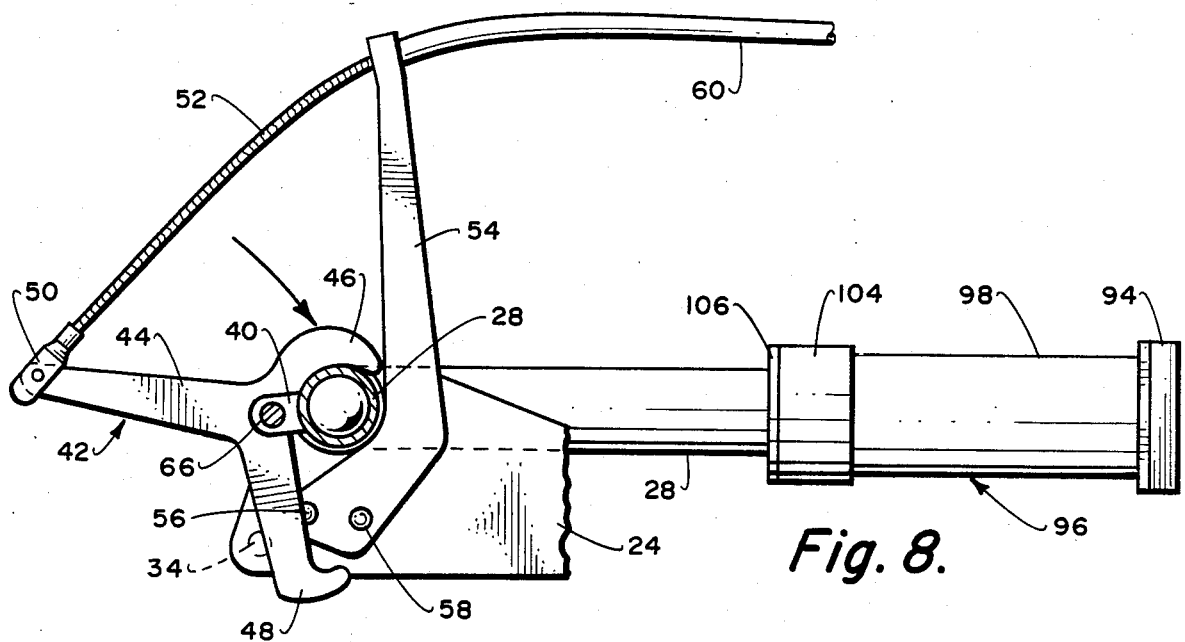
FIG. 8 is a view similar to FIG. 7, but showing the actuator assembly in a still further intermediate operative position.
Figure 9:
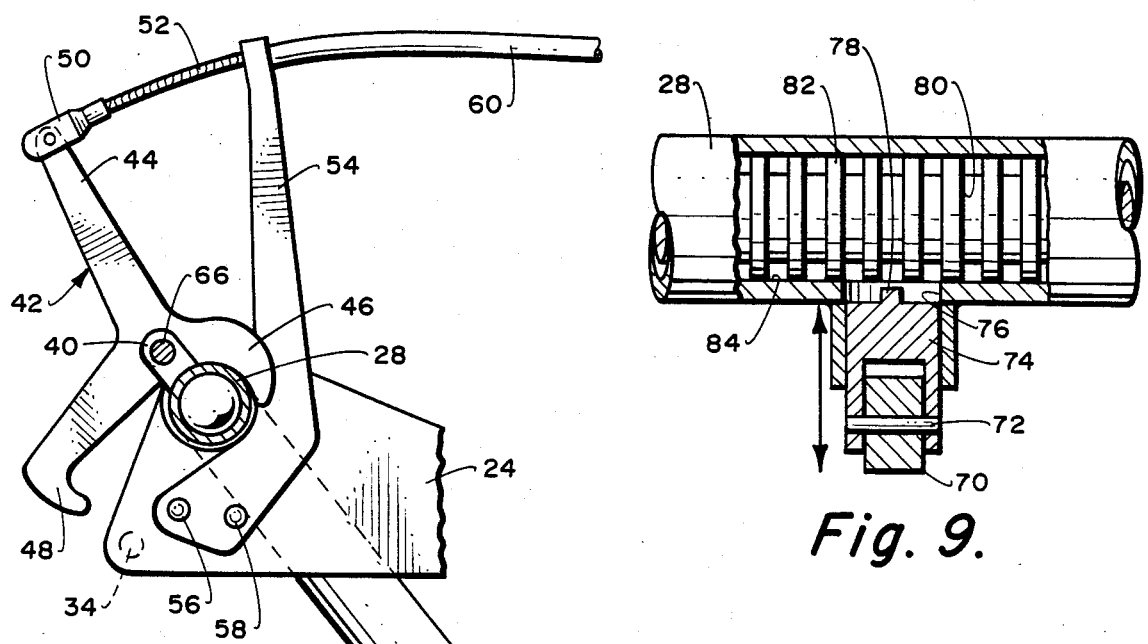
FIG. 9 is a view similar to FIG. 4 but showing the locking assembly in the unlocking position.
Figure 10:
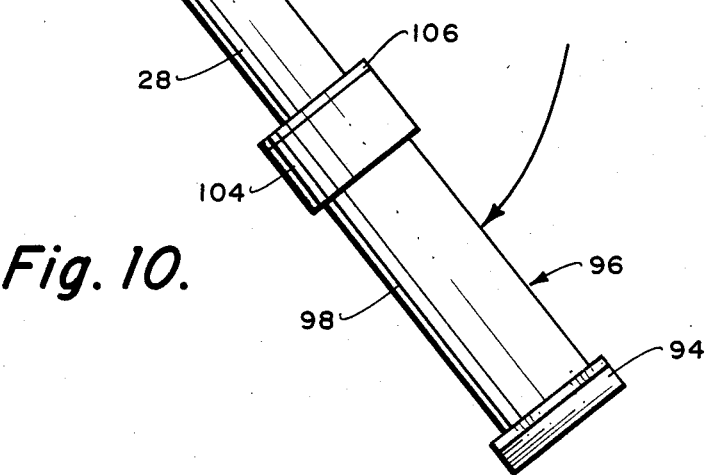
FIG. 10 is a view similar to FIG. 8, but showing the ride-off stand in a still further intermediate position in which the stand is being moved from the stowed position to the extended position.

With the arm member 54 now located as shown in FIG. 7 of the drawings and the pin 58 disengaged from the hook member 48, further pulling movement on the knob 64 will cause the cable 52 to then move within the sheath 60. This results in pivoting of the hook member 42 until the first hook member 46 comes into contact with tubular housing 28. This limited pivoting motion is sufficient to twist the rod 66 sufficiently to disengage the protuberance 78 from the particular groove 80 with which it is associated. This disengaged position is clearly shown in FIG. 9 of the drawings. This position of the hook member 42 is clearly shown in FIG. 8 of the drawings. Continued pulling will result in the cable 52 continuing to move relative to the sheath 60 until pads 94 and 108 of the foot pad assemblies 96 and 116 come into contact with the ground 30. Let it be assumed that the ground 30 is uneven and that one pad, such as pad 94 comes into contact first with the ground 30 with the other pad 108 being spaced from the ground. This is actually shown to occur within FIG. 2 of the drawings. Slight rearward motion of the motorcycle and continued pulling movement of the cable 52 will then cause rod 92 to move within the chamber 84 against the action of the spring 102. This in turn causes the balls 88 to also be moved within the chamber 84 which in turn press against the rod 82 and cause such to slide within chamber 84. The sliding movement of the rod 82 is transferred through the balls 90 to move in an outward direction with the foot pad 108 and will continue to do so until the pad 108 comes into contact with the ground 30. At this particular point of time, both foot pads 94 and 98 are in snug contact with the ground 30 and the motorcycle 22 is held in its desirable vertical position.

The operator releases knob 64 and then proceeds to physically lift the front end of the motorcycle 22 and longitudinally moves such in the rearward direction sufficiently until the tubular housing 28 comes into contact with both rods 34 and 36 which establishes the fully extended position. Releasing the knob 64 causes the hook member 42 to pivot slightly due to the bias of the spring 86. This slight pivoting causes the first hook member 46 to be moved away from the tubular housing 28 and the locking pawl 74 is then moved with respect to the hole 76 until the protuberance 78 comes into contact with the particular aligned groove 80. At this particular time, movement of the rod 82 within the tubular chamber 84 is now prevented and the pads 94 and 108 are positively locked in position supporting the motorcycle 22 in its established vertical position even though the terrain 30 is uneven.

To move the stand 20 to the upper or stowed position, it is understood that the operator only need to operate the motorcycle which in turn will cause the motorcycle to be automatically pivoted to stowed position upon initial movement of the motorcycle.

What is claimed is:

1. A motorcycle ride-off stand comprising:

a tubular housing having an internal open ended chamber, said housing terminating at a first end and a second end;

an elongated rigid member slidably confined with said chamber, said elongated rigid member terminating at a third end and a fourth end;

a plurality of individual members located within said chamber, said individual members comprising a first series and a second series, said first series being located directly adjacent said third end, said second series being located directly adjacent said fourth end, said individual members being movable within said chamber;

a first rod mounted within said first end of said housing, said first rod being movable within said chamber, said first rod to connect with said first series of said individual members;

a first foot pad assembly connected to said first rod, said first foot pad assembly being movable relative to said housing along with said first rod;

a second rod mounted within said second end of said housing, said second rod being movable within said chamber, said second rod to connect with said second series of said individual members;

a second foot pad assembly connected to said second rod, said second foot pad assembly being movable relative to said housing along with said second rod;

whereby movement of said first foot pad assembly in one direction causes said first rod and said first series of individual members to move relative to said tubular housing which in turn moves said elongated rigid member which further moves said second series of individual members and said second rod which results in said second foot pad assembly moving in the direction opposite to said one direction; and locking means connected to said tubular housing, said locking means to engage with said elongated rigid member to maintain an established position of said first and second foot pad assemblies in respect to said tubular housing.

2. A motorcycle ride-off stand comprising:

a tubular housing having an internal open ended chamber, said housing terminating at a first end and a second end;

an elongated rigid member slidably confined with said chamber, said elongated rigid member terminating at a third end and a fourth end;

a plurality of individual members located within said chamber, said individual members comprising a first series and a second series, said first series being located directly adjacent said third end, said second series being located directly adjacent said fourth end, said individual members being movable within said chamber;

a first rod mounted within said first end of said housing, said first rod being movable within said chamber, said first rod to connect with said first series of said individual members;

a first foot pad assembly connected to said first rod, said first foot pad assembly being movable relative to said housing along with said first rod;

a second rod mounted within said second end of said housing, said second rod being movable within said chamber, said second rod to connect with said second series of said individual members;

a second foot pad assembly connected to said second rod, said second foot pad assembly being movable relative to said housing along with said second rod;

whereby movement of said first foot pad assembly in one direction causes said first rod and said first series of individual members to move relative to said tubular housing which in turn moves said elongated rigid member which further moves said second series of individual members and said second rod which results in said second foot pad assembly moving in the direction opposite to said one direction;

said tubular housing being mounted on a mounting frame, said tubular housing being pivotable in respect to said mounting frame from a stowed position to an extended position, an actuator assembly connected to said tubular housing, said actuator assembly being manually operated to affect movement of said tubular housing from said stowed position to said extended position; and locking means connected to said tubular housing, said locking means to engage with said elongated rigid member to maintain an established position of said first and second foot pad assemblies in respect to said tubular housing.

3. The motorcycle ride-off stand as defined in claim 2 wherein:

during operation of said actuating means said locking means is disengaged from said elongated rigid member.

4. A motorcycle ride-off stand comprising:

a U-shaped tubular housing having an internal open ended chamber, said tubular housing defining a pair of spaced-apart leg members each having a free outer end;

a foot pad assembly being mounted to said tubular housing at said free outer end of each said leg member, each said foot pad assembly being movable a limited amount in respect to said tubular housing:

segmental structure in the form of a plurality of separate members being located in a physically abutting relationship within each said end of said chamber, said segmental structure including an elongated rigid member, said structure extending between said foot pad assemblies, whereby movement of one of said foot pad assemblies relative to said tubular housing in one direction will cause the other of said foot pad assemblies to be moved relative to said tubular housing in the opposite direction; and a locking means mounted on said tubular housing, said locking means to be actuatable to engage with said elongated rigid member to maintain said foot pad assemblies in a pre-established position in respect to said tubular housing.

5. The motorcycle ride-off stand as defined in claim 4 wherein:

said separate members comprising a plurality of balls.

* * * * *